(12) United States Patent
Baek et al.

(10) Patent No.: US 12,328,719 B2
(45) Date of Patent: Jun. 10, 2025

(54) METHOD AND APPARATUS FOR DETERMINING PRIORITY VALUE OF RADIO RESOURCE IN WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/792,308

(22) PCT Filed: Jan. 14, 2021

(86) PCT No.: PCT/KR2021/000510
§ 371 (c)(1),
(2) Date: Jul. 12, 2022

(87) PCT Pub. No.: WO2021/145686
PCT Pub. Date: Jul. 22, 2021

(65) Prior Publication Data
US 2023/0057791 A1    Feb. 23, 2023

(30) Foreign Application Priority Data

Jan. 14, 2020 (KR) .................. 10-2020-0005007
Apr. 6, 2020 (KR) .................. 10-2020-0041805

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/569* (2023.01); *H04W 80/02* (2013.01)

(58) Field of Classification Search
CPC .......... H04W 72/569; H04W 72/1268; H04W 80/02; H04L 1/1812
See application file for complete search history.

(56) References Cited

U.S. PATENT DOCUMENTS

2018/0176937 A1    6/2018   Chen et al.
2018/0227805 A1    8/2018   Jang et al.
(Continued)

FOREIGN PATENT DOCUMENTS

CN    110268742 A    9/2019
CN    110535555 A    12/2019
(Continued)

OTHER PUBLICATIONS

NTT DOCOMO, INC.; Report for email discussion [106#53][IIOT] Handling of overlapping PUSCH grant prioritization; 3GPP TSG-RAN2 Meeting #107; R2-1911472; XP051769228; Aug. 26-30, 2019; Aug. 16, 2019; Prague, Czech Republic.

(Continued)

*Primary Examiner* — Jamal Javaid
*Assistant Examiner* — Ryan C Kavleski
(74) *Attorney, Agent, or Firm* — Jefferson IP Law, LLP

(57) ABSTRACT

The present disclosure relates to a communication technique for merging an IoT technology with a 5G communication system for supporting a higher data transmission rate than a 4G system, and a system therefor. The present disclosure can be applied to intelligent services (for example, smart homes, smart buildings, smart cities, smart cars or connected cars, healthcare, digital education, retail, security- and safety-related services, and the like) on the basis of 5G commu- (Continued)

nication technologies and IoT-related technologies. The present disclosure relates to a method performed by a terminal in a wireless communication system and an apparatus for performing same, the method comprising the steps of obtaining an uplink transmission resource, determining whether a medium access control (MCA) protocol data unit (PDU), which is to be transmitted as the uplink transmission resource, is stored in a hybrid automatic repeat request (HARQ) buffer, and identifying the priority of the uplink transmission resource on the basis of a result of the determination.

14 Claims, 15 Drawing Sheets

(51) Int. Cl.
*H04W 72/566* (2023.01)
*H04W 80/02* (2009.01)

(56) References Cited

U.S. PATENT DOCUMENTS

| | | | |
|---|---|---|---|
| 2019/0028924 | A1 | 1/2019 | Kim |
| 2020/0221490 | A1 | 7/2020 | Baek et al. |
| 2021/0050901 | A1* | 2/2021 | Chin ............... H04L 1/1614 |
| 2021/0058817 | A1* | 2/2021 | Wu ................ H04W 28/0257 |
| 2022/0158769 | A1 | 5/2022 | Gou et al. |
| 2022/0183050 | A1* | 6/2022 | Marco .............. H04L 1/1822 |
| 2022/0183051 | A1* | 6/2022 | Fu .................. H04L 1/1848 |
| 2022/0345252 | A1* | 10/2022 | Loehr ............... H04L 1/1812 |

FOREIGN PATENT DOCUMENTS

| | | | |
|---|---|---|---|
| KR | 10-2020-0085138 | A | 7/2020 |
| WO | 2019/029432 | A1 | 2/2019 |
| WO | 2019/066558 | A1 | 4/2019 |
| WO | 2019/246285 | A1 | 12/2019 |

OTHER PUBLICATIONS

Huawei et al.; Prioritization issues for MAC CEs; 3GPP TSG-RAN WG2 Meeting 107-Bis; R2-1913243; Update of R2-1901210; XP051804928; Oct. 14-18, 2019; Oct. 4, 2019; Chongqing, China.

Huawei et al.; Further discussion on NR SL and NR UL prioritization; 3GPP TSG-RAN WG2 Meeting #107 bis; R2-1913709; XP051805174; Oct. 14-18, 2019; Oct. 4, 2019; Chongqing, China.
Huawei et al.; Prioritization between configured and dynamic grants; 3GPP TSG-RAN WG2 Meeting#106; R2-1906505; Revision of R2-1903368; XP051710819; May 13-17, 2019; May 3, 2019; Reno, United States.
Intel Corporation; Intra-UE prioritization of UL Data Data; 3GPP TSG-RAN WG2 Meeting #107bis; R2-1912718; Revision of R2-1910454; XP051804609; Oct. 14-18, 2019; Oct. 4, 2019; Chongqing, China.
Ericsson; Main functions of intra-UE data-data prioritization; 3GPP TSG-RAN WG2 #108 Tdoc; R2-1914758; Revision of R2-1912555; XP051815742; Nov. 18-22, 2019; Nov. 7, 2019; Reno, Nevada, US.
European Search Report dated Jan. 3, 2023; European Appln. No. 21741080.2-1215 / 4075909 PCT/KR2021000510.
Sony, Handling a deprioritized PDU for uplink Intra-UE prioritization in IIoT, R2-1913352, 3GPP TSG-RAN WG2 Meeting #107-Bis, Oct. 4, 2019, Chongqing, China.
Chinese Office Action dated Jul. 4, 2024, issued in Chinese Application No. 202180010003.1.
Samsung; Transmission of Deprioritized Data by Retransmission Grant; 3GPP TSG-RAN2 Meeting #108; R2-1916221; (Revision of R2-12501); Nov. 18-22, 2019; Reno, USA.
Nokia et al.; Intra-UE Prioritization between SR and PUSCH; 3GPP TSG-RAN WG2 Meeting #108; R2-1915492; Nov. 18-22, 2019; Reno, USA.
Samsung; TP for LCH-priority based Data-Data and SR-Data prioritization; 3GPP TSG-RAN2 Meeting #108; R2-1916526; Nov. 18-22, 2019; Reno, USA.
CATT; MAC PDU Priority Determination; 3GPP TSG-RAN WG2 Meeting #108; R2-1914413; Nov. 18-22, 2019; Reno, USA.
Lg Electronics Inc, Ul data prioritization for the DG/CG conflict and the CG/CG conflict, 3GPP Draft; R2-1905016, 3GPP TSG-RAN WG2 Meeting #105bis, Apr. 6, 2019, XP051702294.
VIVO, Discussion on the MAC PDU recovery procedure, 3GPP Draft; R2-1914966, 3GPP TSG-RAN WG2 Meeting #108, Nov. 8, 2019, XP051816903.
Nokia et al., Handling of De-prioritized Uplink Transmission, 3GPP Draft; R2-1906188, 3GPP TSG-RAN WG2 Meeting #106, May 13, 2019, XP051729663.
European Office Action dated Nov. 27, 2024, issued in European Patent Application No. 21741080.2.
Chinese Office Action dated Dec. 23, 2024, issued in Chinese Patent Application No. 202180010003.1.
Chinese Office Action dated Mar. 27, 2025, issued in Chinese Application No. 202180010003.1.

* cited by examiner

METHOD AND APPARATUS FOR DETERMINING PRIORITY VALUE OF RADIO RESOURCE IN WIRELESS COMMUNICATION SYSTEM

TECHNICAL FIELD

The disclosure relates to the operation of a user equipment (UE) and a base station in a mobile communication system. The disclosure relates to a method of determining the priority value of a radio resource and an apparatus for performing the same in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

DISCLOSURE OF INVENTION

Technical Problem

Various embodiments of the disclosure provide a method of determining and processing the priority value of a radio resource and an apparatus for performing the same in a wireless communication system.

Solution to Problem

According to an embodiment of the disclosure, there is provided a method of a user equipment (UE) in a wireless communication system, the method including obtaining an uplink transmission resource, determining whether a medium access control (MAC) protocol data unit (PDU) to be transmitted in the uplink transmission resource is stored in a hybrid automatic repeat request (HARQ) buffer, and identifying a priority of the uplink transmission resource based on a result of the determination.

According to an embodiment of the disclosure, there is provided a user equipment (UE) in a wireless communication system, the UE including a transceiver, and a controller configured to obtain an uplink transmission resource, to determine whether a medium access control (MAC) protocol data unit (PDU) to be transmitted in the uplink transmission resource is stored in a hybrid automatic repeat request (HARQ) buffer, and to identify a priority of the uplink transmission resource based on a result of the determination.

The technical subjects pursued in embodiments of the disclosure may not be limited to the above mentioned technical subjects, and other technical subjects which are not mentioned may be clearly understood, through the following descriptions, by those skilled in the art to which the disclosure pertains.

Advantageous Effects of Invention

According to various embodiments of the disclosure, there are provided a method of determining and processing the priority value of a radio resource and an apparatus for performing the same in a wireless communication system.

MODE FOR THE INVENTION

Figure 1:
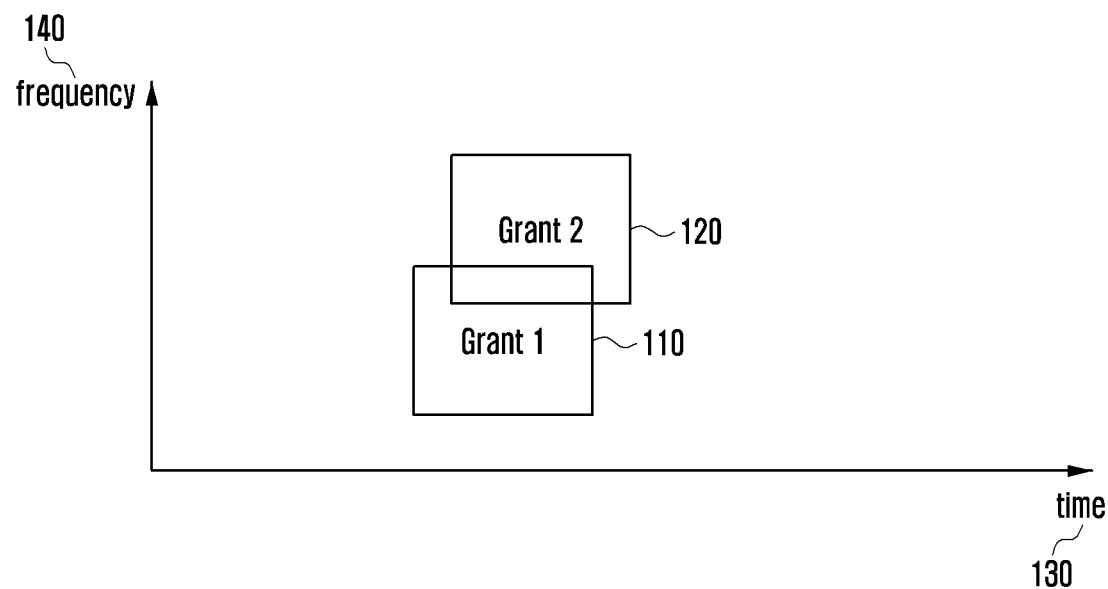
FIG. 1 is a diagram illustrating a scenario in which a plurality of uplink radio resources overlap according to an embodiment of the disclosure.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

FIG. 1 is a diagram illustrating a scenario in which a plurality of uplink radio resources overlap according to an embodiment of the disclosure.

A base station may allocate, to a user equipment (UE), uplink radio resources (Grant1 110, Grant2 120) usable for uplink transmission, and the uplink radio resources 110 and 120 may overlap in the time axis 130, or in the time axis 130 and the frequency axis 140. Here, the allocated resource may be one of a Dynamic Grant (DG) that allocates a resource in every physical downlink control channel (PDCCH) and a Configured Grant (CG) that repeatedly allocates a resource at regular intervals if it is once configured. The Configured Grant may be activated immediately upon configuration, or may be activated by a separate activation command. It may be assumed that such a Configured Grant is used for data having a fixed traffic pattern or having a high priority. According to an embodiment of the disclosure, a predetermined uplink resource may be exclusively allocated to data that requires a short delay requirement. To this end, via a radio resource control (RRC) configuration message, the base station may configure whether to use a predetermined uplink resource for each predetermined logical channel for a UE.

As illustrated in FIG. 1, in the case in which the uplink resources 110 and 120 overlap in the time axis or in the time axis and the frequency axis, the UE may select and transmit a single radio resource. In this instance, the resource that is selected by the UE and is used for uplink transmission may be a resource indicating a logical channel that has data to actually transmit and has a priority of a high priority value. To this end, the UE may determine the priority value of each uplink radio resource. In the case in which a MAC PDU to be transmitted in the corresponding uplink radio resource is already produced, the priority of the uplink radio resource may be determined to be the highest priority among priorities of data (or data and a medium access control (MAC) control element (CE)) included in the corresponding MAC PDU. Otherwise, in the case in which the MAC PDU to be transmitted in the corresponding uplink radio resource is not produced, the priority of the uplink radio resource may be determined to be the highest priority among the priorities of logical channels available that can be multiplexed (multiplexing) to the corresponding uplink resource. To this end, the priority of the uplink radio resource may be determined to be the highest priority among the highest priorities of logical channels (or logical channel and MAC CE) having data (or data and MAC CE) to transmit among logical channels capable of using the corresponding uplink radio resources (or logical channel and MAC CE).

In addition, although the corresponding uplink radio resource is allocated but is actually incapable of being used, the corresponding radio resource needs not to be a resource selected for transmission. For example, although the corresponding radio resource is a Configured Grant resource, in the case in which a Configured Grant timer for a hybrid automatic repeat request (HARQ) process of the resource operates, the Configured Grant may not be transmitted. As another example, in the case in which the corresponding uplink radio resource is allocated by a configured scheduling radio network temporary identifier (CS-RNTI), and is a retransmission resource for the Configured Grant of which a new data indicator (NDI) is not toggled, the corresponding resource may not be used for transmission when the HARQ buffer of a corresponding HARQ process is empty. As another example, although the corresponding uplink radio resource is a partial resource of a bundle and is not the initial transmission resource of the bundle, the resource may not be used for transmission when the HARQ buffer of the corresponding HARQ process is empty. Such unavailable radio resource may be excluded in the process of determining the priorities of conflicted resources, or the priority value of the corresponding resource may be set to a predetermined low value so as to be prevented from being used for transmission. According to an embodiment of the disclosure, by setting the priority value of the corresponding resource to the lowest value, the corresponding resource may be prevented from being used for transmission.

Figure 2:
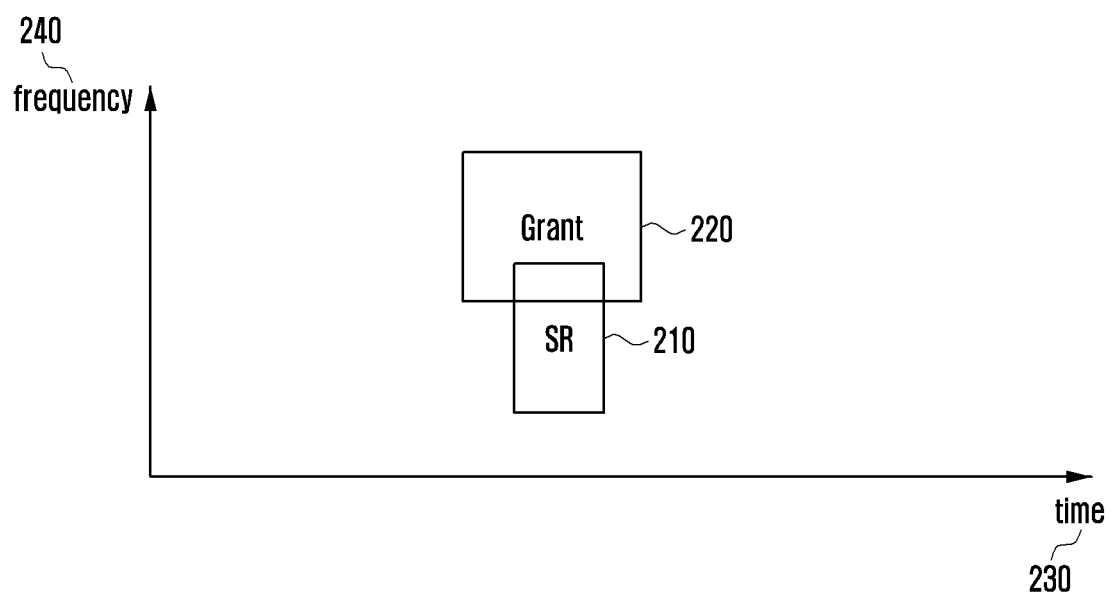
FIG. 2 is a diagram illustrating a scenario in which a scheduling request (SR) and an uplink radio resource overlap according to an embodiment of the disclosure.

FIG. 2 is a diagram illustrating a scenario in which a scheduling request (SR) and an uplink radio resource overlap according to an embodiment of the disclosure.

A base station may allocate an SR configuration resource 210 to transmit a scheduling request message to a UE. The base station may allocate an uplink radio resource 220 to be used for uplink transmission to the UE. Here, the allocated resource may be one of a Dynamic Grant (DG) that allocates a resource in every physical downlink control channel (PDCCH) and a Configured Grant (CG) that repeatedly allocates a resource at regular intervals if it is once configured. The Configured Grant may be activated immediately upon configuration, or may be activated by a separate activation command. It may be assumed that such a Configured Grant is used for data having a fixed traffic pattern or having a high priority. According to an embodiment of the disclosure, a predetermined uplink resource may be exclusively allocated to data that requires a short delay requirement. To this end, the base station may configure whether to use a predetermined uplink resource for each predetermined logical channel for a UE via an RRC configuration message. The SR configuration resource 210 and the uplink radio resource 220 may overlap in a time axis 230, or in the time axis 230 and a frequency axis 240.

As illustrated in FIG. 2, in the case in which the SR configuration resource 210 and the uplink resource 220 overlap in the time axis or in the time axis and frequency axis, the UE may need to select and transmit one of the SR resource and the uplink radio resource. In this instance, the resource that is selected by the UE and is used for uplink transmission may be a resource having a priority of a high priority value of a logical channel that triggers an SR to be actually transmitted, and a priority of a high priority value of a logical channel for data (or data and MAC CE) to be transmitted in the uplink radio resource. To this end, the UE may determine the priority value of each uplink radio resource. In the case in which a MAC PDU to be transmitted in the corresponding uplink radio resource is already produced, the priority of the uplink radio resource may be determined to be the highest priority among priorities of data (or data and MAC CE) included in the corresponding MAC PDU. Otherwise, in the case in which the MAC PDU to be transmitted in the corresponding uplink radio resource is not produced, the priority of the uplink radio resource may be determined to be the highest priority among the priorities of logical channels available that can be multiplexed (multiplexing) to the corresponding uplink resource. To this end, the priority of the uplink radio resource may be determined to be the highest priority of the highest priorities of logical channels (or logical channel and MAC CE) having data to transmit (or data and MAC CE) among logical channels capable of using the corresponding uplink radio resources (or logical channel and MAC CE).

In the case in which an SR configuration is present but the SR configuration is not used for triggering SR transmission, or in the case in which SR transmission is triggered but is already canceled, the corresponding SR configuration needs not to be selected for transmission. Such SR configuration resource that is not transmitted may be excluded in the process of comparing the priority of an SR with the priority of an uplink radio resource, or the priority value of the corresponding SR configuration is set to a predetermined low value and may be prevented from being used for transmission. According to an embodiment of the disclosure, the priority value of the corresponding SR configuration may be set to the lowest value so that the corresponding SR configuration may be prevented from being used for transmission.

In addition, although the corresponding uplink radio resource is allocated but is actually incapable of being used, the corresponding radio resource needs not to be a resource selected for transmission. For example, although the corresponding radio resource is a Configured Grant resource, in the case in which a Configured Grant timer for a hybrid automatic repeat request (HARQ) process of the resource operates, the Configured Grant may not be transmitted. As another example, in the case in which the corresponding uplink radio resource is allocated by a CS-RNIT, and is a retransmission resource for a Configured Grant of which an NDI is not toggled, the resource may be used for transmission when the HARQ buffer of a corresponding HARQ process is empty. As another example, although the corresponding uplink radio resource is a partial resource of a bundle, and is not the initial transmission resource of the bundle, the resource may not be used for transmission when the HARQ buffer of the corresponding HARQ process is empty. Such unavailable radio resource may be excluded in the process of determining the priorities of conflicted resources, or the priority value of the corresponding resource may be set to a predetermined low value so as to be prevented from being used for transmission. According to an embodiment, the priority value of the corresponding resource may be set to the lowest value so that the corresponding resource may be prevented from being used for transmission.

Figure 3:
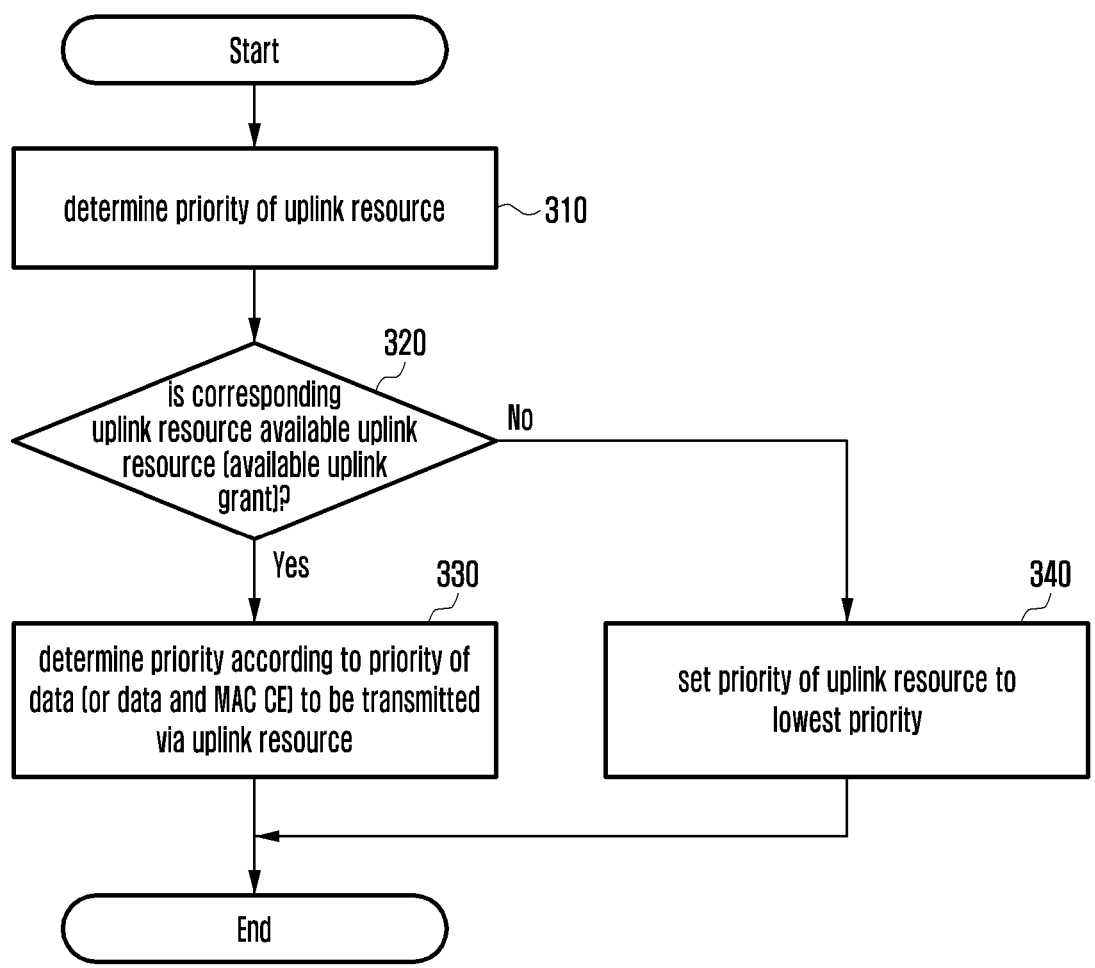
FIG. 3 is a diagram illustrating a method of determining the priority of an uplink resource according to an embodiment of the disclosure.

FIG. 3 is a diagram illustrating a method of determining the priority of an uplink resource according to an embodiment of the disclosure.

In the case in which a UE is allocated with an uplink radio resource, the UE or a MAC device of the UE may need to determine the priority of the uplink radio resource in operation 310. The priority may be determined when the corresponding uplink radio resource overlaps another uplink radio resource or a scheduling request resource in the time axis or in the time and frequency axes. To determine the priority of the uplink radio resource, the UE may identify whether the radio resource is an available uplink resource in operation 320. The available uplink resource refers to an uplink resource that is actually allocated and has the possibility of being used. The fact that an allocated uplink resource is an unavailable resource indicates that the allocated uplink resource has the possibility of not being used. In the case in which an allocated uplink resource satisfies at least one of the following conditions, this means that the allocated uplink resource is an unavailable uplink resource.

- The corresponding uplink resource be a Configured Grant resource, and a Configured Grant timer of a HARQ process of the corresponding resource be running. In this instance, the UE is incapable of performing data transmission using the corresponding Configured Grant resource and thus, the resource may be an unavailable uplink resource.
- The uplink resource be allocated by a CS-RNTI, an NDI not be toggled, and the HARQ buffer for a HARQ process of the corresponding resource be empty. In this instance, a MAC PDU that the UE is capable of transmitting in the corresponding uplink resource is not present, and thus the resource may be an unavailable uplink resource.
- The uplink resource be a part of a bundle, but not be a first transmission resource, and the HARQ buffer for a HARQ process of the corresponding resource be empty. In this instance, a MAC PDU that the UE is capable of transmitting in the corresponding uplink resource is not present, and thus the resource may be an unavailable uplink resource.

In the case in which the corresponding uplink radio resource is not an unavailable uplink resource (in the case of an available uplink resource), the resource may be classified as an available uplink resource (available uplink grant). In the case in which the uplink radio resource is an available uplink resource, the priority of data to be transmitted (data to be transmitted and MAC CE) via an uplink resource may be determined based on the priority of the corresponding uplink radio resource in operation 330.

Otherwise, in the case in which the corresponding uplink resource is an unavailable uplink radio resource, the priority of the uplink resource is set to the lowest priority so that the corresponding radio resource is prevented from being selected in operation 340. The corresponding uplink resource may not become a prioritized uplink resource, and may become a deprioritized uplink resource. In addition, according to another embodiment of the disclosure, in the case of an unavailable uplink radio resource, the priority of the corresponding radio resource may be determined based on the priority of data to be transmitted (or data to be transmitted and MAC CE) in the same manner as operation 330, and the corresponding radio resource may be considered as a deprioritized uplink resource. The deprioritized uplink resource may not be used for actual transmission.

Figure 4:
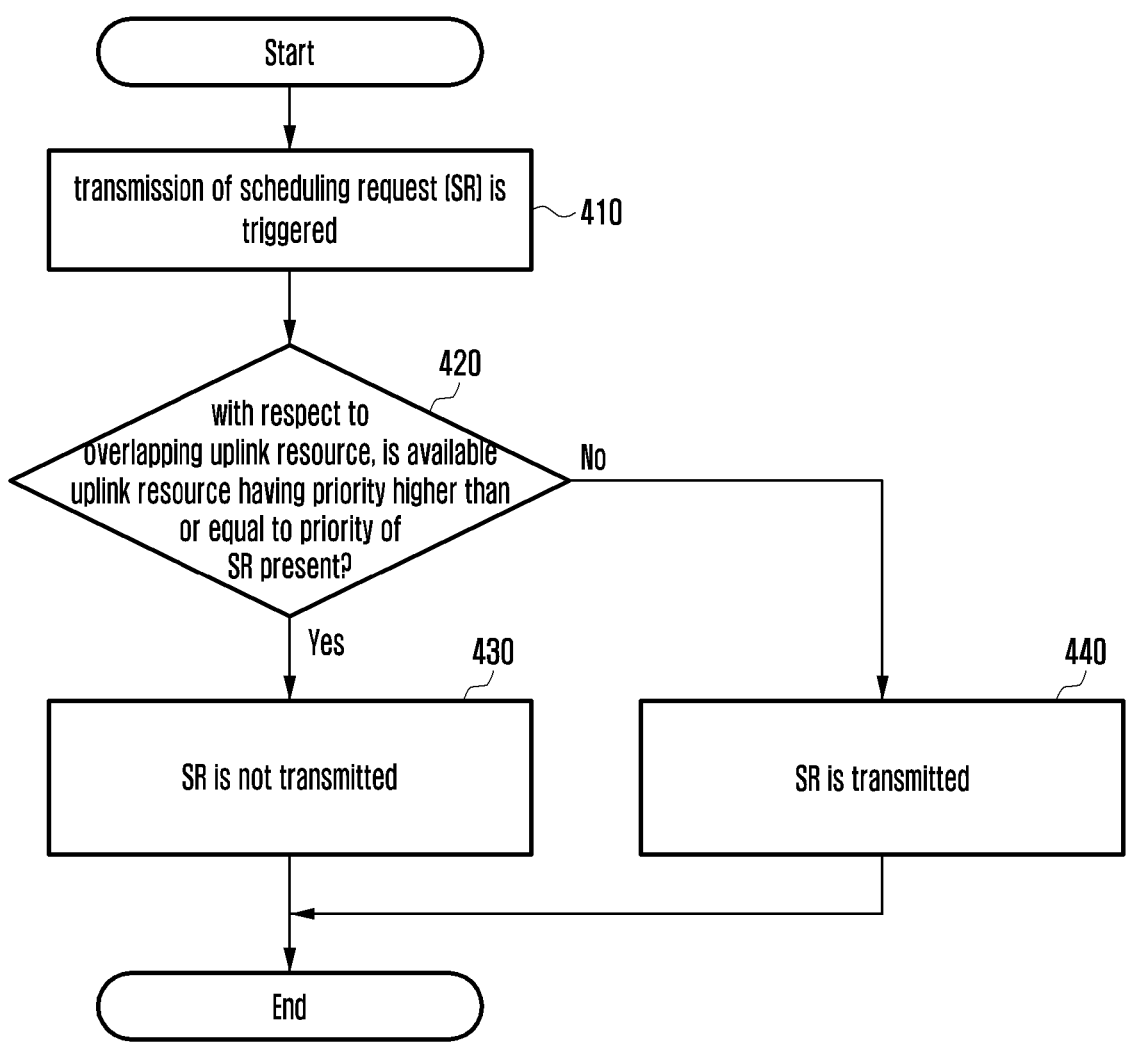
FIG. 4 is a diagram illustrating a method of determining the priority of scheduling request transmission according to an embodiment of the disclosure.

FIG. 4 is a diagram illustrating a method of determining the priority of scheduling request transmission according to an embodiment of the disclosure. In the case in which a UE has uplink data, and does not receive an uplink radio resource allocated for transmitting the same, the UE may trigger (triggering) transmission of a scheduling request (SR) message in operation 410. In the case in which the SR is triggered, the UE may transmit a scheduling request message in a radio resource indicated by a corresponding SR configuration. The radio resource indicated by the SR configuration may be located in a physical uplink control channel (PUCCH) physical channel, and an available SR configuration may be determined depending on a logical channel that triggers a scheduling request. Although the transmission of a scheduling request message is triggered, the scheduling request message may not be always transmitted. In the case in which the scheduling request message is canceled, the scheduling request message may not be transmitted actually. In the embodiment of FIG. 4, the situation is assumed in which a scheduling request message is triggered and is not canceled.

Although the scheduling request message is triggered and is not canceled, in the case in which the scheduling request message overlaps an uplink resource for another data in the time axis or in the time and frequency axis, priorities may be compared and whether to transmit the scheduling request message may be determined. Here, the overlapping uplink resource may be the resource of a physical uplink shared channel (PUSCH) physical channel. To this end, with respect to the uplink resource that overlaps a resource in which the scheduling request message is to be transmitted, whether an available uplink resource that has a priority higher than or equal to the priority of the SR is present may be identified in operation 420. Here, the priority of the SR may be the priority of a logical channel that triggers the scheduling request message. The priority of the uplink resource may be determined according to the method described with reference to FIGS. 3, 7, 8, and the like.

Regarding the uplink resource that overlaps the resource in which the scheduling request message is to be transmitted, in the case in which an available uplink resource having a priority higher than or equal to the priority of the SR is present, the scheduling request message may not be transmitted in operation 430. Here, the available uplink resource refers to an uplink radio resource that has the possibility of being actually transmitted as described in the embodiment of FIG. 3. Otherwise, regarding the overlapping uplink resource, in the case in which an available uplink resource having a priority higher than or equal to the priority of the SR is not present, the scheduling request message may be transmitted in operation 440.

Figure 5:
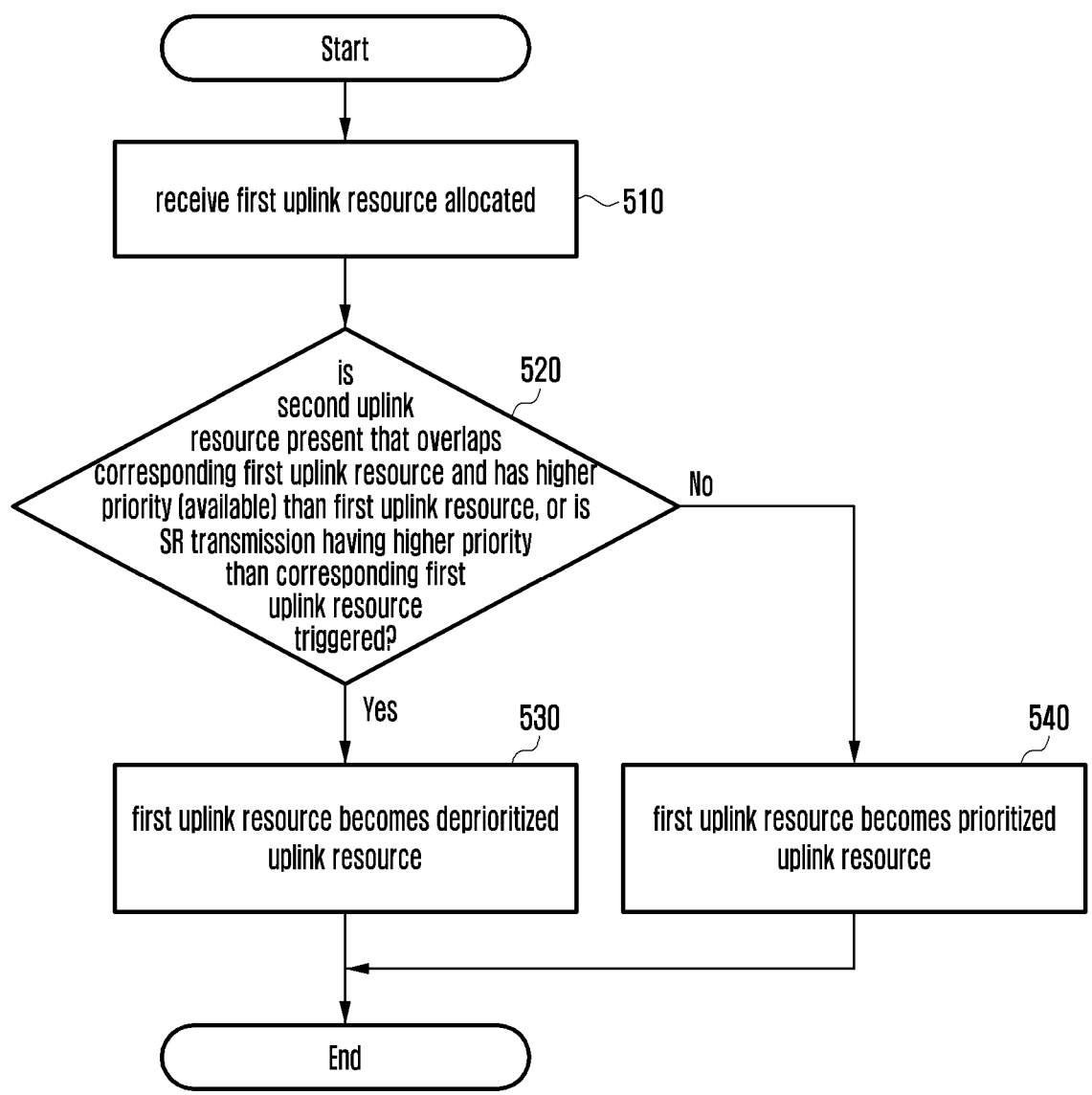
FIG. 5 is a diagram illustrating a method of selecting a prioritized uplink resource according to an embodiment of the disclosure.

FIG. 5 is a diagram illustrating a method of selecting a prioritized uplink resource according to an embodiment of the disclosure.

In the case in which a UE receives the resource of a Configured Grant or a Dynamic Grant allocated in operation 510, the UE may need to determine whether to perform actual transmission in the corresponding resource. The uplink resource allocated in operation 510 may be referred to as a first uplink resource. In the case in which the first uplink resource is a prioritized uplink resource (prioritized uplink grant), the UE may actually perform transmission using the corresponding uplink resource. Otherwise, in other words, in the case in which the first uplink resource is not a prioritized uplink resource or is a deprioritized uplink resource, the corresponding uplink resource may not be used for actual transmission.

To this end, the UE may need to identify the priority of SR transmission or another uplink resource that overlaps the allocated first uplink resource in the time axis or in the time and frequency axis in operation 520. 1) In the case in which a second uplink resource is present that overlaps the allocated first uplink resource in the time axis or in the time axis and frequency axis, and has a higher priority than that of the first uplink resource, or 2) in the case in which SR transmission that overlaps the allocated first uplink resource in the time axis or in the time axis and frequency axis, and has a higher priority than that of the first uplink resource is triggered, the corresponding first uplink resource may not be a prioritized uplink resource. In some embodiments of the disclosure, such resource may be defined as a deprioritized uplink resource in operation 530. Otherwise, in the case in which the condition of operation 520 is not satisfied, the first uplink resource may be a prioritized uplink resource in operation 540.

According to another embodiment of the disclosure, the second uplink resource described in operation 520 may be limited to an available second uplink resource. Therefore, it prevents the situation in which the priority of an unavailable second uplink resource is higher than that of the first uplink resource, and the transmission of both the first uplink resource and the second uplink resource is unavailable. Accordingly, when comparing with an uplink resource that overlaps the first uplink resource, only an available uplink resource that overlaps in the time axis or in the time axis and frequency axis may be considered as the second uplink resource.

Figure 6:
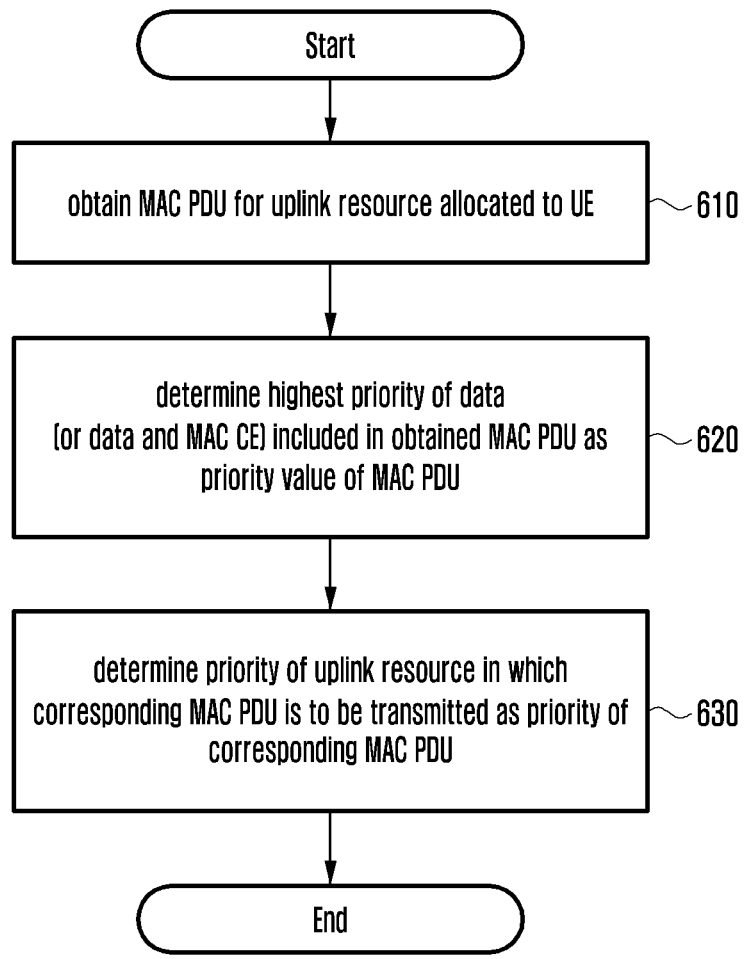
FIG. 6 is a diagram illustrating a procedure that determines the priority of a produced medium access control (MAC) protocol data unit (PDU) according an embodiment of the disclosure.

FIG. 6 is a diagram illustrating a procedure of determining the priority of a produced MAC PDU according to an embodiment of the disclosure.

In the case in which a UE determines to transmit a MAC protocol data unit (PDU) in an allocated uplink resource, the UE may need to obtain a new MAC PDU if a MAC PDU to be transmitted is not stored in the HARQ buffer of the UE. In the embodiment of FIG. 6, it is assumed that the UE obtains a MAC PDU for an allocated uplink resource in operation 610. Here, obtaining of the MAC PDU refers to a process of going through a logical channel prioritization operation, multiplexing a MAC CE or logical channel data to the corresponding MAC PDU, and storing the same in the HARQ buffer. Therefore, in the case in which a MAC PDU is obtained, a MAC device of the UE may be aware of the priority information associated with data included in the MAC PDU. Based on the same, the UE may determine the highest priority of data (or data and a MAC CE) included in the MAC PDU as the priority value of the MAC PDU in operation 620.

The MAC device of the UE may store the priority, and later on, may use the same when the priority value of the same MAC PDU is needed. In other words, the stored priority of the corresponding MAC PDU may be determined as the priority of an uplink resource in which the MAC PDU is transmitted or retransmitted and may be used in operation 630. For example, in the case in which another uplink radio resource or SR transmission overlaps an uplink radio resource in which the MAC PDU is to be transmitted in the time axis or in the time axis and frequency axis, the UE may use the stored priority of the MAC PDU as the priority of the uplink radio resource, and may determine a resource to be used for transmission.

Figure 7:
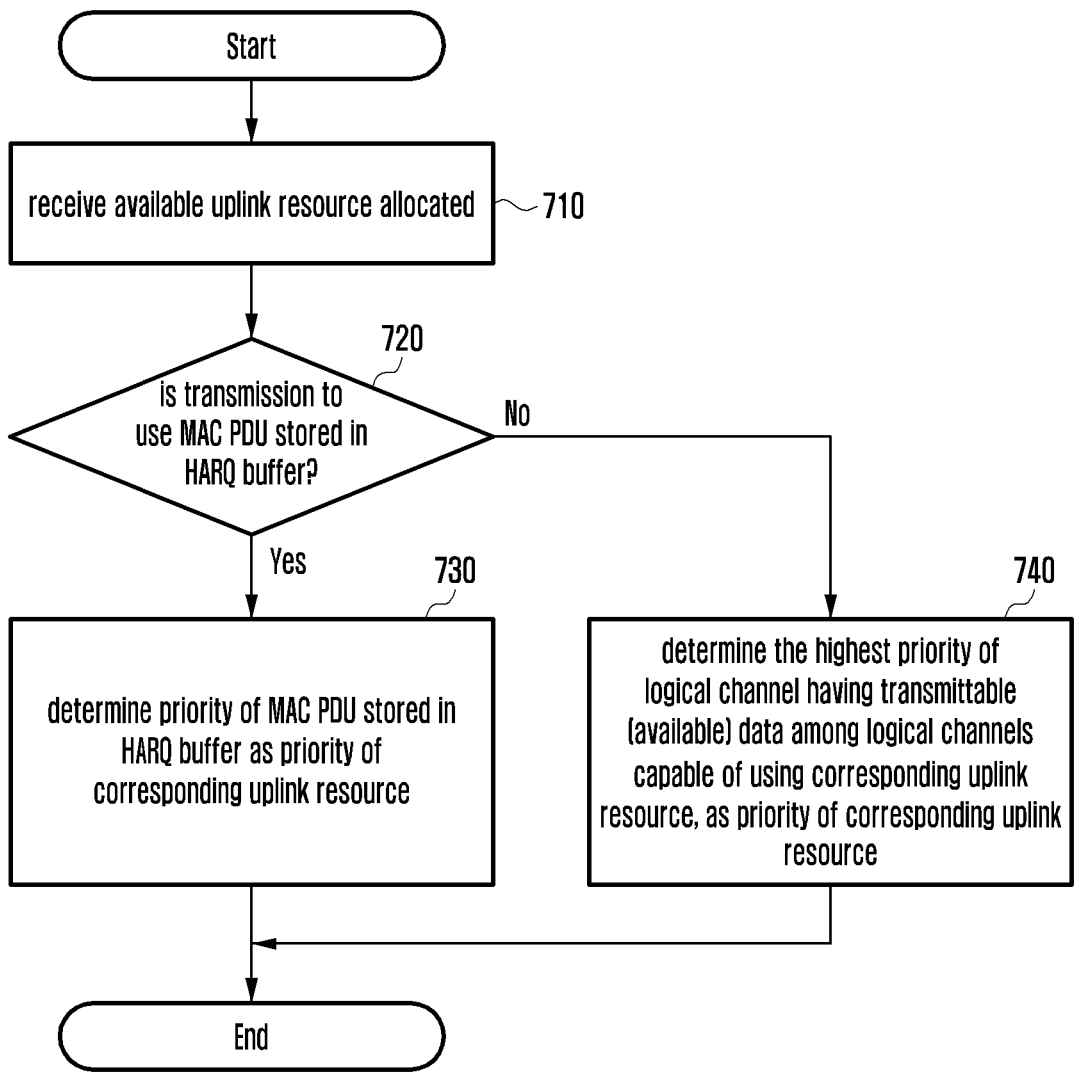
FIG. 7 is a diagram illustrating a method of determining the priority of an uplink radio resource according to an embodiment of the disclosure.

FIG. 7 is a diagram illustrating a method of determining the priority of an uplink radio resource according to an embodiment of the disclosure.

In the embodiment of FIG. 7, it is assumed that a UE receives an available uplink resource allocated and needs to determine the priority of the corresponding uplink resource in operation 710. The priority of the uplink resource may be needed only when the priority is used. Such priority of an uplink resource may be determined differently depending on whether a MAC PDU to be transmitted in the uplink resource is stored in advance. However, the priority of the uplink resource may not be determined only based on whether a MAC PDU is stored in a HARQ buffer associated with the corresponding uplink resource. Although a MAC PDU is stored in the HARQ buffer, in the case in which a new uplink transmission is performed, the existing stored MAC PDU may need to be discarded and a new MAC PDU may need to be obtained. Therefore, the UE may need to identify whether the MAC PDU stored in the HARQ buffer for the allocated uplink resource is to be used for transmission in operation 720.

Transmission that uses a MAC PDU stored in a HARQ buffer used by an allocated uplink resource may be the case that satisfies at least one of some or all of the following conditions.
  A MAC PDU for a HARQ process used by the allocated uplink resource has been obtained, but is not transmitted yet.
  The allocated uplink resource is a Configured Grant resource, and a MAC PDU for the HARQ process that the Configured Grant uses is not prioritized in a previous Configured Grant and is not transmitted.
  The allocated uplink resource is a resource allocated by a cell-radio network temporary identifier (C-RNTI) or a CS-RNTI, an NDI is not toggled, and the HARQ buffer for a HARQ process that the allocated uplink resource uses is not empty.
  The allocated uplink resource is a part of the resource of a bundle, and is not an initial transmission resource of the bundle, but the HARQ buffer of the corresponding HARQ process is not empty.

In the case of transmission that uses a MAC PDU stored in the HARQ buffer used by the allocated uplink resource, the UE may determine the priority of the MAC PDU stored in the HARQ buffer as the priority of the corresponding uplink resource in operation 730. The priority of the MAC PDU may be the priority of the MAC PDU stored at the point in time at which the MAC PDU is obtained as illustrated in the embodiment of FIG. 6 in operation 620. The priority of the uplink resource may be determined as the priority of the MAC PDU. However, according to another embodiment of the disclosure, the highest priority among the priorities of data or the priorities of the data and MAC CE included in a MAC PDU stored at the point in time at which the priority of the MAC PDU needs to be determined may be determined as the priority of the MAC PDU, and the priority of the MAC PDU may be determined as the priority of the corresponding uplink resource. According to another embodiment of the disclosure, the highest priority among the priorities of data or the priorities of the data and the MAC CE included in a MAC PDU stored at the point in time at which the priority of an uplink resource needs to be determined may be determined as the priority of the uplink resource including the corresponding MAC PDU.

Transmission that does not use a MAC PDU stored in a HARQ buffer used by an allocated uplink resource may be the case that satisfies at least one of some or all of the following conditions.
  The allocated uplink resource is allocated by a C-RNTI or a CS-RNTI, and an NDI is toggled.
  The allocated uplink resource is a resource allocated by the C-RNTI, and a HARQ buffer is empty.
  The allocated uplink resource is a resource received via a random access response (RAR).
  The allocated uplink resource is a resource allocated using a C-RNTI via a PDCCH channel during a random access window, and a random access operation that begins for beam failure recovery may be successfully completed using the PDCCH.
  The allocated uplink resource is a part of the resource of a bundle, and an initial transmission resource of the bundle.
  The allocated available uplink resource does not satisfy a transmission condition that uses a MAC PDU stored in a HARQ buffer.

In the case in which the allocated uplink resource does not correspond to transmission that uses a MAC PDU stored in a HARQ buffer, the UE may determine the highest priority of a logical channel having transmittable (available) data among logical channels available that can be used by the corresponding uplink resource, as the priority of the corresponding uplink resource in operation 740.

Figure 8:
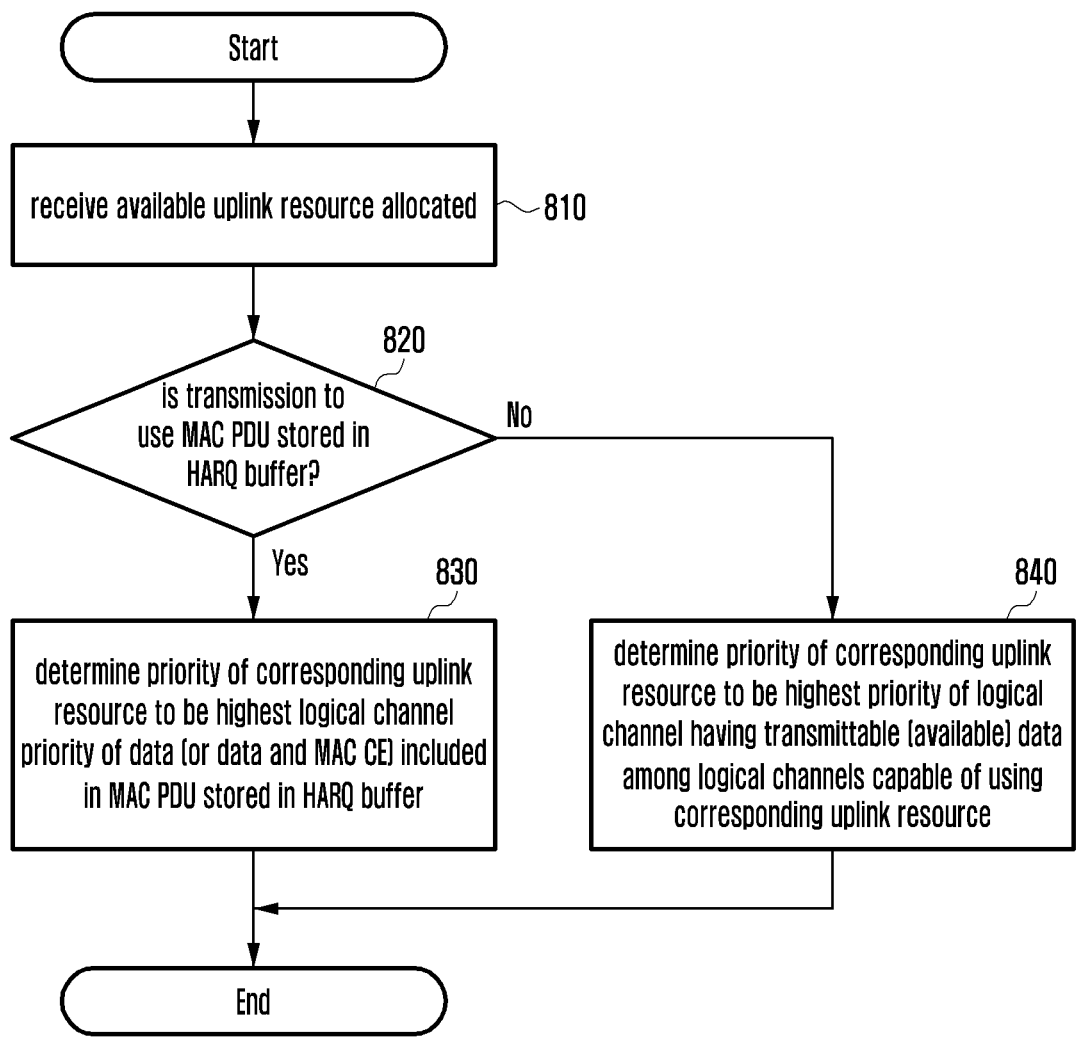
FIG. 8 is a diagram illustrating a method of determining the priority of an uplink radio resource according to an embodiment of the disclosure.

FIG. 8 is a diagram illustrating a method of determining the priority of an uplink radio resource according to an embodiment of the disclosure.

In the embodiment of FIG. 8, it is assumed that a UE receives an available uplink resource allocated and needs to determine the priority of the corresponding uplink resource in operation 810. The priority of the uplink resource may be needed only when the priority is used. Such priority of an uplink resource may be differently determined based on whether a MAC PDU to be transmitted in the uplink resource is stored in advance. However, the priority of the uplink resource may not be determined only based on whether a MAC PDU is stored in the HARQ buffer for the corresponding uplink resource. Although the MAC PDU is stored in the HARQ buffer, the existing stored MAC PDU may need to be discarded when new uplink transmission is performed, and a new MAC PDU may need to be obtained. Therefore, the UE may need to identify whether the MAC PDU stored in the HARQ buffer for the allocated uplink resource is to be used for transmission in operation 820.

Transmission that uses a MAC PDU stored in a HARQ buffer used by an allocated uplink resource may be the case that satisfies at least one of some or all of the following conditions.

A MAC PDU for HARQ process used by an allocated uplink resource has been obtained, but is not transmitted yet.

The allocated uplink resource is a Configured Grant resource, and a MAC PDU for the HARQ process that the Configured Grant uses is not prioritized in a previous Configured Grant and is not transmitted.

The allocated uplink resource is a resource allocated by a C-RNTI or a CS-RNTI, an NDI is not toggled, and the HARQ buffer for a HARQ process that the allocated uplink resource uses is not empty.

The allocated uplink resource is a part of the resource of a bundle, and is not an initial transmission resource of the bundle, but the HARQ buffer of the corresponding HARQ process is not empty.

In the case of transmission that uses a MAC PDU stored in the HARQ buffer used by the allocated uplink resource, the UE may determine the highest logical channel priority of data or data and MAC CE included in the MAC PDU stored in the HARQ buffer, as the priority of the corresponding uplink resource in operation 830.

Transmission that does not use a MAC PDU stored in a HARQ buffer used by an allocated uplink resource may be the case that satisfies at least one condition among some or all of the following conditions.

The allocated uplink resource is allocated by a C-RNTI or a CS-RNTI, and an NDI is toggled.

The allocated uplink resource is a resource allocated by the C-RNTI, and a HARQ buffer is empty.

The allocated uplink resource is a resource via a random access response (RAR).

The allocated uplink resource is a resource allocated using a C-RNTI via a PDCCH channel during a random access window, and a random access operation that begins for beam failure recovery may be successfully completed using the PDCCH.

The allocated uplink resource is a part of the resource of a bundle, and an initial transmission resource of the bundle.

The allocated available uplink resource does not satisfy a transmission condition that uses a MAC PDU stored in a HARQ buffer.

In the case in which the allocated uplink resource does not correspond to transmission that uses a MAC PDU stored in a HARQ buffer, the UE may determine the highest priority of a logical channel that has transmittable (available) data among logical channels available that can be used by the corresponding uplink resource, as the priority of the corresponding uplink resource in operation 840.

Figure 9:
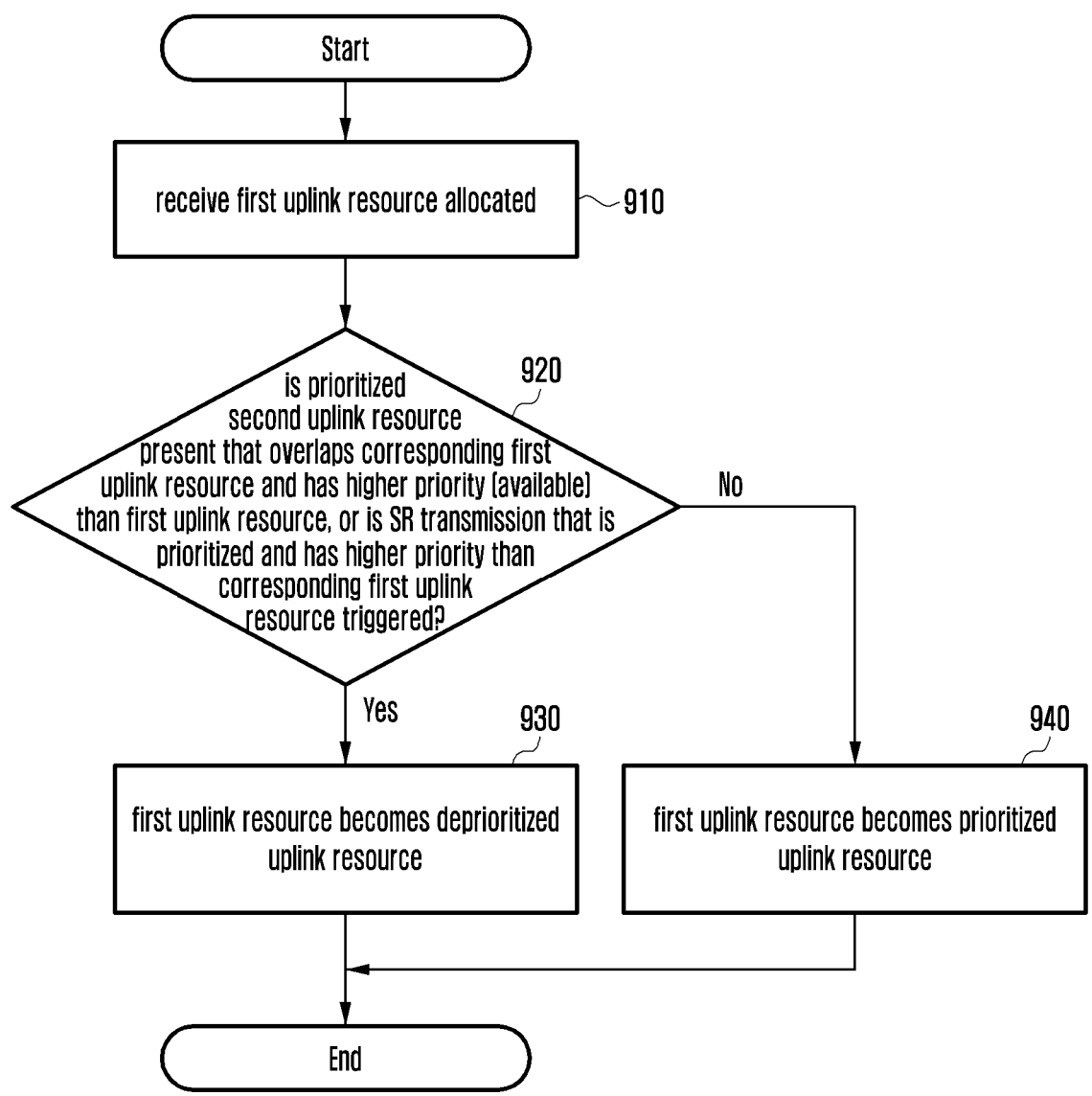
FIG. 9 is a diagram illustrating a method of selecting a prioritized uplink resource according to an embodiment of the disclosure.

FIG. 9 is a diagram illustrating a method of selecting a prioritized uplink resource according to an embodiment of the disclosure.

In the case in which a UE receives the resource of a Configured Grant or a Dynamic Grant allocated in operation 910, the UE may need to determine whether to perform actual transmission in the corresponding resource. The uplink resource allocated in operation 910 may be referred to as a first uplink resource. In the case in which the first uplink resource is a prioritized uplink resource (prioritized uplink grant), the UE may actually perform transmission using the corresponding uplink resource. Otherwise, in other words, in the case in which the first uplink resource is not a prioritized uplink resource or is a deprioritized uplink resource, the UE may not actually perform transmission using the corresponding uplink resource. To this end, the UE may need to identify the priority of SR transmission or an uplink resource that overlaps the allocated first uplink resource in the time axis or in the time and frequency axis in operation 920. 1) In the case in which a prioritized second uplink resource is present that overlaps the allocated first uplink resource in the time axis or in the time axis and frequency axis, and has a higher priority (or is available and has a higher priority) than that of the first uplink resource, or 2) in the case in which prioritized SR transmission that overlaps the allocated first uplink resource in the time axis or in the time axis and frequency axis, and has a higher priority than that of the first uplink resource is triggered, the corresponding first uplink resource may not be a prioritized uplink resource. In some embodiments of the disclosure, such resource may be defined as a deprioritized uplink resource in operation 930. Otherwise, in the case in which the condition of operation 920 is not satisfied, the first uplink resource may be a prioritized uplink resource in operation 940.

Figure 10:
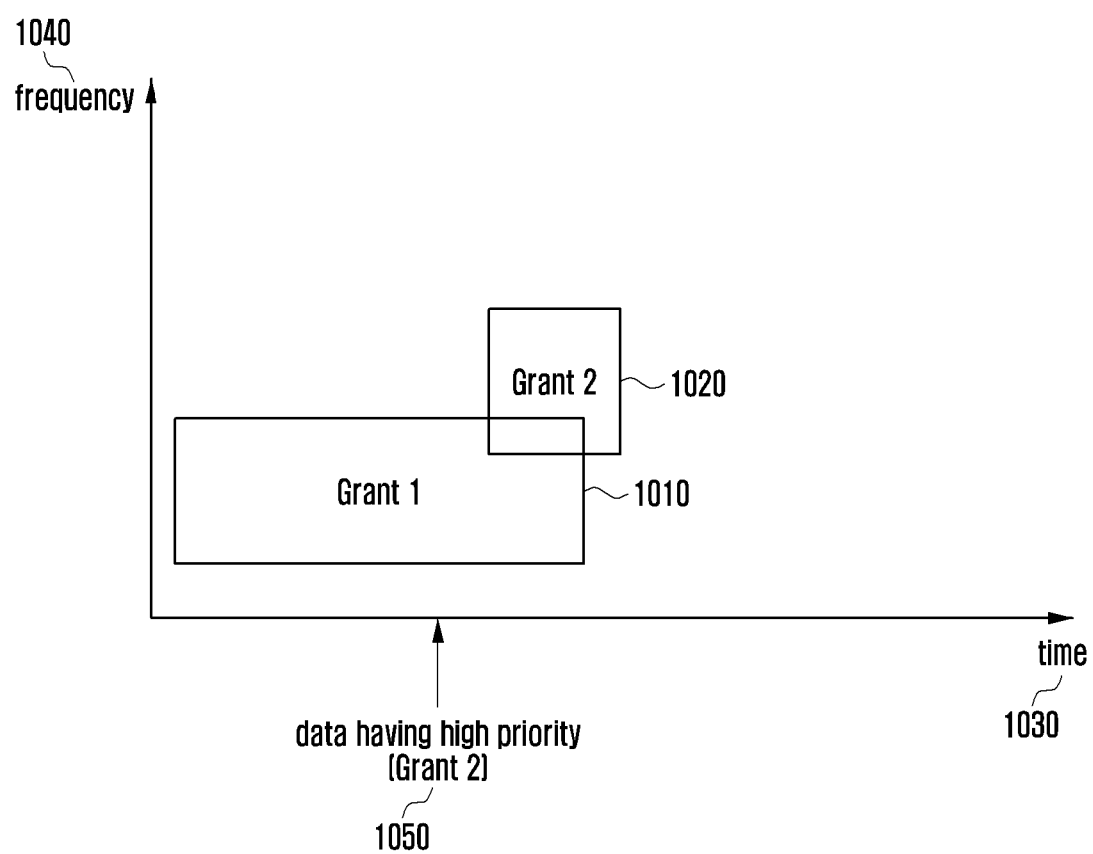
FIG. 10 is a diagram illustrating a scenario in which a plurality of uplink radio resources overlap according to an embodiment of the disclosure.

FIG. 10 is a diagram illustrating a scenario in which a plurality of uplink radio resources overlap according to an embodiment of the disclosure.

A base station may allocate, to a UE, uplink radio resources (Grant1 1010, Grant2 1020) usable for uplink transmission, and the uplink radio resources 1010 and 1020 may overlap in a time axis 1030, or in the time axis 1030 and a frequency axis 1040. Here, the allocated resource may be one of a Dynamic Grant (DG) that allocates a resource in every physical downlink control channel (PDCCH) and a Configured Grant (CG) that repeatedly allocates a resource at regular intervals if it is once configured. The Configured Grant may be activated immediately upon configuration, or may be activated by a separate activation command. It may be assumed that such a Configured Grant is used for data having a fixed traffic pattern or having a high priority. According to an embodiment of the disclosure, a predetermined uplink resource may be exclusively allocated to data that requires a short delay requirement. To this end, the base station may configure whether to use a predetermined uplink resource for each predetermined logical channel for a UE via a radio resource control (RRC) configuration message.

As illustrated in FIG. 10, in the case in which the uplink resources 1010 and 1020 overlap in the time axis, or in the time axis and the frequency axis, the UE may need to select and transmit a single radio resource. In this instance, the resource that is selected by the UE and is used for uplink transmission may be a resource indicating a logical channel that has data to actually transmit and has a high priority of a high priority value. To this end, the UE may determine the priority value of each uplink radio resource. In the case in which a MAC PDU to be transmitted in a corresponding uplink radio resource is already produced, the priority of the uplink radio resource may be determined to be the highest priority among priorities of data (or data and medium access control (MAC) control element (CE)) included in the corresponding MAC PDU. Otherwise, in the case in which the MAC PDU to be transmitted in the corresponding uplink radio resource is not produced, the priority of the uplink radio resource may be determined to be the highest priority among the priorities of logical channels available that can be multiplexed (multiplexing) to the corresponding uplink resource. To this end, the priority of the uplink radio resource may be determined to be the highest priority among the highest priorities of logical channels (or logical channel and MAC CE) having data (or data and MAC CE) to transmit among logical channels capable of using the corresponding uplink radio resource (or logical channel and MAC CE).

In addition, although the corresponding uplink radio resource is allocated but is actually incapable of being used, the corresponding radio resource may need to be prevented from being a resource selected for transmission. For example, although the corresponding radio resource is a Configured Grant resource, in the case in which a Configured Grant timer for a hybrid automatic repeat request (HARQ) process of the resource operates, the Configured Grant may not be transmitted. As another example, in the case in which the corresponding uplink radio resource is allocated by a configured scheduling radio network temporary identifier (CS-RNTI), and a new data indicator (NDI) is a retransmission resource for a Configured Grant of which a new data indicator (NDI) is not toggled, the corresponding resource may not be used for transmission when a HARQ buffer of the corresponding HARQ process is empty. As another example, if the corresponding uplink radio resource is a part of the resource of a bundle, and is not the initial transmission resource of the bundle, the resource may not be used for transmission when the HARQ buffer of the corresponding HARQ process is empty. Such unavailable radio resource may be excluded in the process of determining the priority of conflicted resources, or the priority value of the corresponding resource may be set to a predetermined low value so as to be prevented from being used for transmission. According to an embodiment of the disclosure, the priority value of the corresponding resource may be set to the lowest value so that the corresponding resource may be prevented from being used for transmission.

In order to determine the transmission of the first uplink radio resource 1010, comparison with the priority of the second uplink radio resource 1020 that overlaps the first uplink radio resource 1010 in the time axis or in the time axis and the frequency axis needs to be performed, and then, which of the uplink radio resources is to be transmitted may be determined. In the case in which the first uplink radio resource 1010 has a high priority and becomes a prioritized uplink radio resource (prioritized uplink grant) before the point in time at which the first uplink radio resource 1010 is transmitted, the second uplink radio resource 1020 that overlaps in the time axis, or in the time axis and frequency axis may be a deprioritized uplink radio resource (deprioritized uplink grant). However, in the case in which data having a higher priority than the priority of the second uplink radio resource 1020 arrives among data available that can be transmitted in the second uplink radio resource 1020 in operation 1050, while the first uplink radio resource 1010 is transmitted, the priority of a logical channel available that can be multiplexed to the second uplink radio resource 1020, in other words, the priority of a logical channel available that can be transmitted in the second uplink radio resource 1020 may be increased. In the case in which the priority of the uplink radio resource is increased, the uplink radio resource having the increased priority may be a prioritized uplink radio resource. The second uplink radio resource 1020 has been a deprioritized uplink radio resource due to a priority lower than that of the first uplink radio resource 1010, but since data with a higher priority than the priority of the first uplink radio resource 1010 arrives, the second uplink radio resource 1020 may be changed to a prioritized uplink radio resource. In this instance, although the transmission of the first uplink radio resource 1010 is being performed, the transmission of the first uplink radio resource is suspended and the transmission of the second uplink radio resource 1020 may be performed for transmission of the newly prioritized second uplink radio resource 1020. However, such suspension of the transmission of the first uplink radio resource 1010 may be performed only when the amount of time sufficient to suspend the transmission of the first uplink radio resource 1010 remains in a physical layer (PHY), and a priority index used in a physical layer (PHY priority index) for the second uplink radio resource 1020 has a higher priority than a PHY priority index used for the first uplink radio resource 1010. Otherwise, in the case in which the PHY priority index for the first uplink radio resource 1010 is the same as the PHY priority index for the second uplink radio resource 1020, the transmission of the first uplink radio resource 1010 may not be suspended even though the second uplink radio resource 1020 is a prioritized uplink radio resource.

Figure 11:
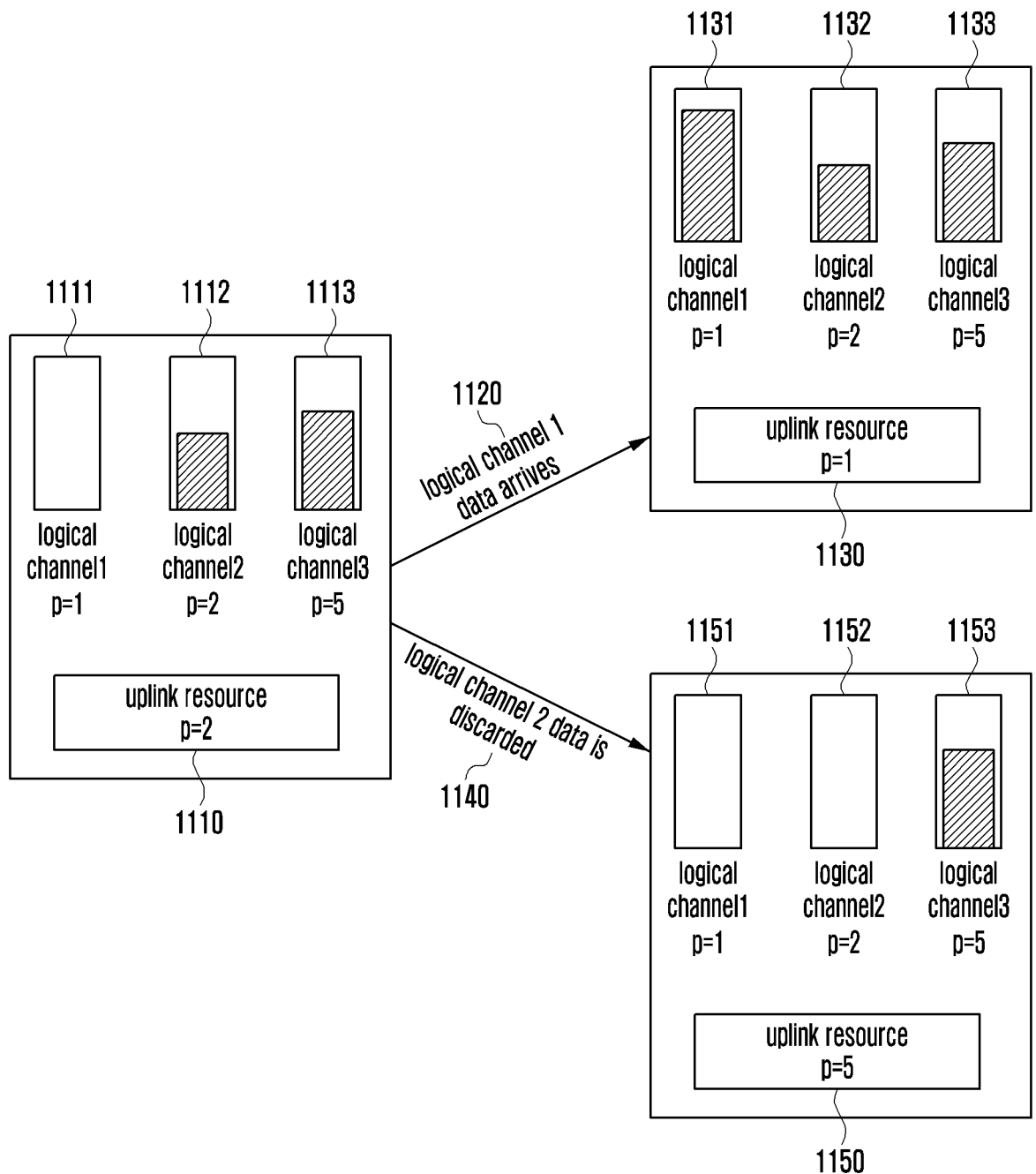
FIG. 11 is a diagram illustrating a scenario in which the priority of an uplink radio resource is changed.

FIG. 11 is a diagram illustrating a scenario in which the priority of an uplink radio resource is changed. In the case in which a MAC PDU that is to currently use an uplink radio resource is already produced, the priority of the uplink radio resource may be determined to be the highest priority among logical channel priorities of data multiplexed to the MAC PDU. However, the MAC PDU is multiplexed before the point in time at which data is transmitted and thus, a MAC PDU that is to use the uplink radio resource may not be generated at the point in time at which the priority of the uplink radio resource is determined. In the case in which a MAC PDU that is to use the uplink radio resource is not produced, the priority of the corresponding uplink resource may be determined to be the highest priority of a logical channel having transmittable (available) data among logical channels capable of using the corresponding uplink resource.

In the embodiment of FIG. 11, it is assumed that a logical channel capable of using an uplink radio resource at any point in time after an uplink radio resource is allocated, are logical channel 1 1111, logical channel 2 1112, and logical channel 3 1113. However, it is assumed that the logical channel 1 1111 does not have data to transmit, and the logical channel 2 1112 and the logical channel 3 1113 have transmittable data. In this instance, the priority of the uplink radio resource may be determined to be 2 that is the priority (p=2) of the logical channel 2 which has a higher priority between the priorities of the logical channel 2 and the logical channel 3 having data to transmit, as shown in diagram 1110.

Subsequently, if data for the logical channel 1 1111 arrives as shown in diagram 1120, the priority of the uplink radio resource may be determined to be 1 that is the priority (p=1) of the logical channel 1 1131, which is the highest priority among the priorities of the logical channel 1 1131, the logical channel 2 1132, and the logical channel 3 1133 having transmittable data as shown in diagram 1130. In the case in which a PDCP discard timer expires or the data of the logical channel 2 1112 is discarded due to transmission to another logical channel as shown in diagram 1140, the logical channel 1 1151 and the logical channel 2 1153 do not have transmittable data and thus, the priority of the uplink radio resource may be determined to be 5 that is the priority (p=5) of the logical channel 3 1153, which is the highest priority among the priority of the logical channel 3 1153 that has transmittable data, as shown in diagram 1150.

The embodiment of FIG. 11 illustrates an example in which the priority of an uplink radio resource is capable of being changed. However, when an operation of determining the priority of an uplink radio resource based on the priority of a logical channel having transmittable data is frequently performed, the operation may be an unnecessary operation. The transmission of the uplink radio resource is performed once at the most and thus, an operation of determining a priority for transmission and determining whether an uplink radio resource is a prioritized uplink radio resource may need to be performed minimally only when a changed priority or the fact whether an uplink radio resource is prioritized actually affects radio resource transmission. Therefore, in the disclosure, in the case in which data having a higher priority than the priority of the existing uplink radio resource arrives and the priority of the uplink radio resource is increased as shown in diagram 1120, the priority value of the uplink radio resource may be determined again, and whether the uplink radio resource is a prioritized uplink radio resource may be determined. In addition, only when a priority index used in the physical layer (PHY priority index) of the uplink radio resource has a higher priority than a PHY priority index for another uplink radio resource that overlaps in the time axis, the priority value of the uplink radio resource may be determined again, and whether the uplink radio resource is a prioritized uplink radio resource may be determined.

According to another embodiment, only when the uplink radio resource, which was not a prioritized uplink radio resource, becomes a prioritized uplink radio resource and actual transmission is available, the priority value of the uplink radio resource may be determined again and whether the uplink radio resource is a prioritized uplink radio resource may be determined. In this instance, in the case in which data of a logical channel that has a higher priority than that of the current uplink radio resource, and is available that can be transmitted using the uplink radio resource arrives, the priority value of the uplink radio resource may be determined again, and whether the uplink radio resource is a prioritized uplink radio resource may be determined.

Figure 12:
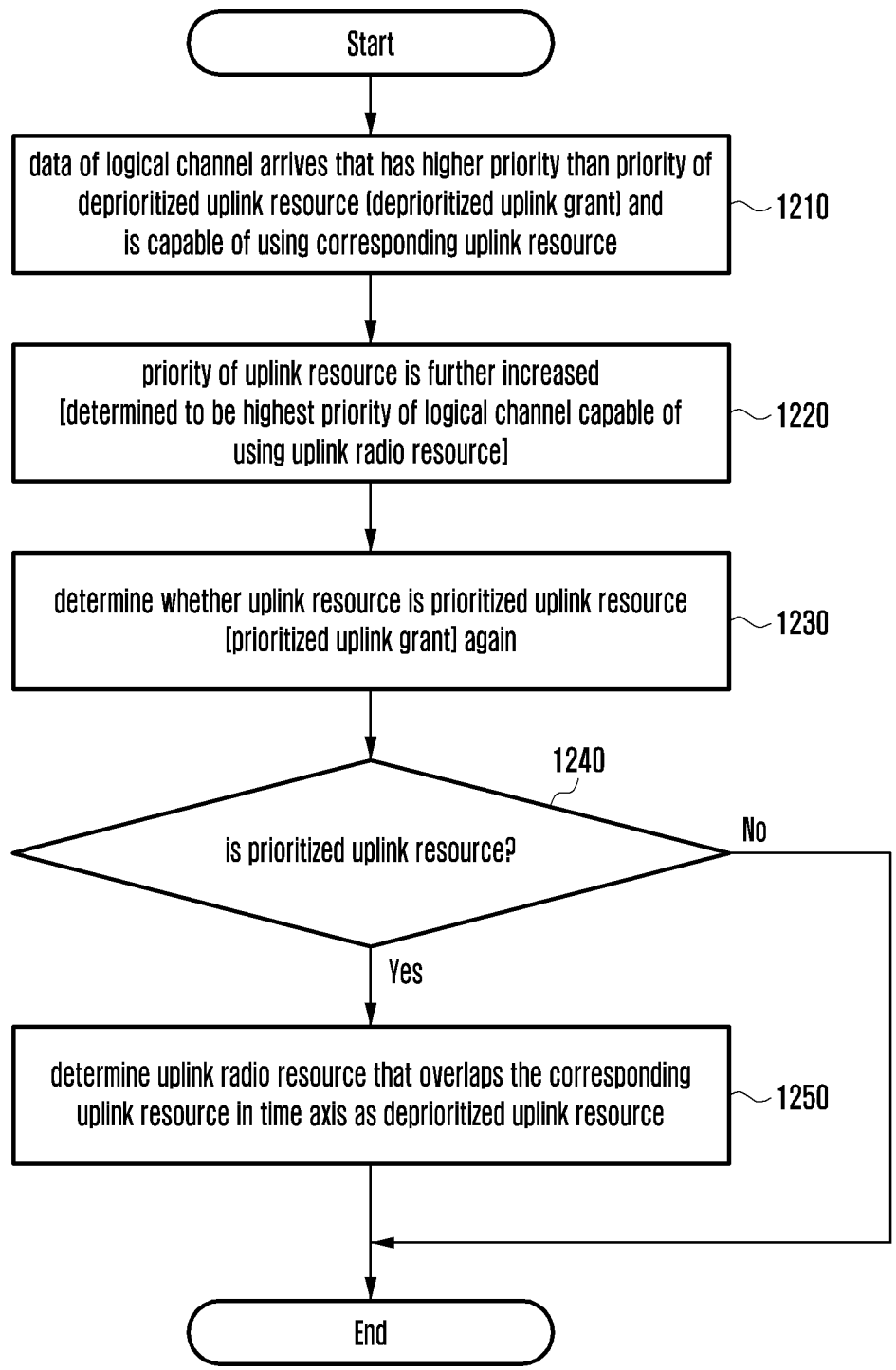
FIG. 12 is a diagram illustrating an operation of determining whether an uplink radio resource is a prioritized uplink radio resource.

FIG. 12 is a diagram illustrating an operation of determining whether an uplink radio resource is a prioritized uplink radio resource. In the case in which an uplink radio resource is allocated, the priority of the corresponding uplink radio resource may be determined according to the embodiments which have been described with reference to FIGS. 6, 7, 8, and 11. In the case in which the priority of the uplink radio resource is determined, whether the corresponding uplink radio resource is a prioritized uplink radio resource (prioritized uplink grant) or a deprioritized uplink radio resource (deprioritized uplink grant) may be determined according to the embodiments which have been described with reference to FIGS. 5, 9, and 11. A prioritized uplink radio resource may be an uplink radio resource that is capable of being used for actual transmission, and a deprioritized uplink radio resource is not used for actual transmission. However, for the reason that data having a high priority arrives at a deprioritized uplink radio resource, or the like, in the case in which the priority of the corresponding uplink radio resource is further increased (the priority value is changed to a smaller value), the uplink radio resource may have the possibility of being a prioritized uplink radio resource.

In the embodiment of FIG. 12, it is assumed that data of a logical channel having a higher priority than that of a deprioritized uplink radio resource, and is capable of using the corresponding uplink radio resource arrives in operation 1210. In this instance, the priority of the uplink radio resource may be further increased. In the case in which a MAC PDU that is to use the uplink radio resource is not produced in advance, the priority of the uplink radio resource may be determined to be the highest priority of a logical channel capable of using the uplink radio resource in operation 1220. In the case in which the priority of the uplink radio resource is changed, whether the uplink radio resource is a prioritized uplink radio resource may be determined in operation 1230.

A UE may determine whether the uplink radio resource is a prioritized uplink resource in operation 1240. An operation of determining whether the uplink radio resource is a prioritized uplink radio resource may be determined according to the method described with reference to FIGS. 5, 9, and 11, or may be determined according to other predetermined methods. In the case in which the uplink radio resource is determined as a prioritized uplink radio resource in operation 1240, another uplink radio resource that overlaps the corresponding uplink radio resource in the time axis may be determined as a deprioritized uplink radio resource (deprioritized uplink grant) in operation 1250. Transmission of the corresponding uplink radio resource to the physical layer which is a lower layer may be indicated.

Figure 13:
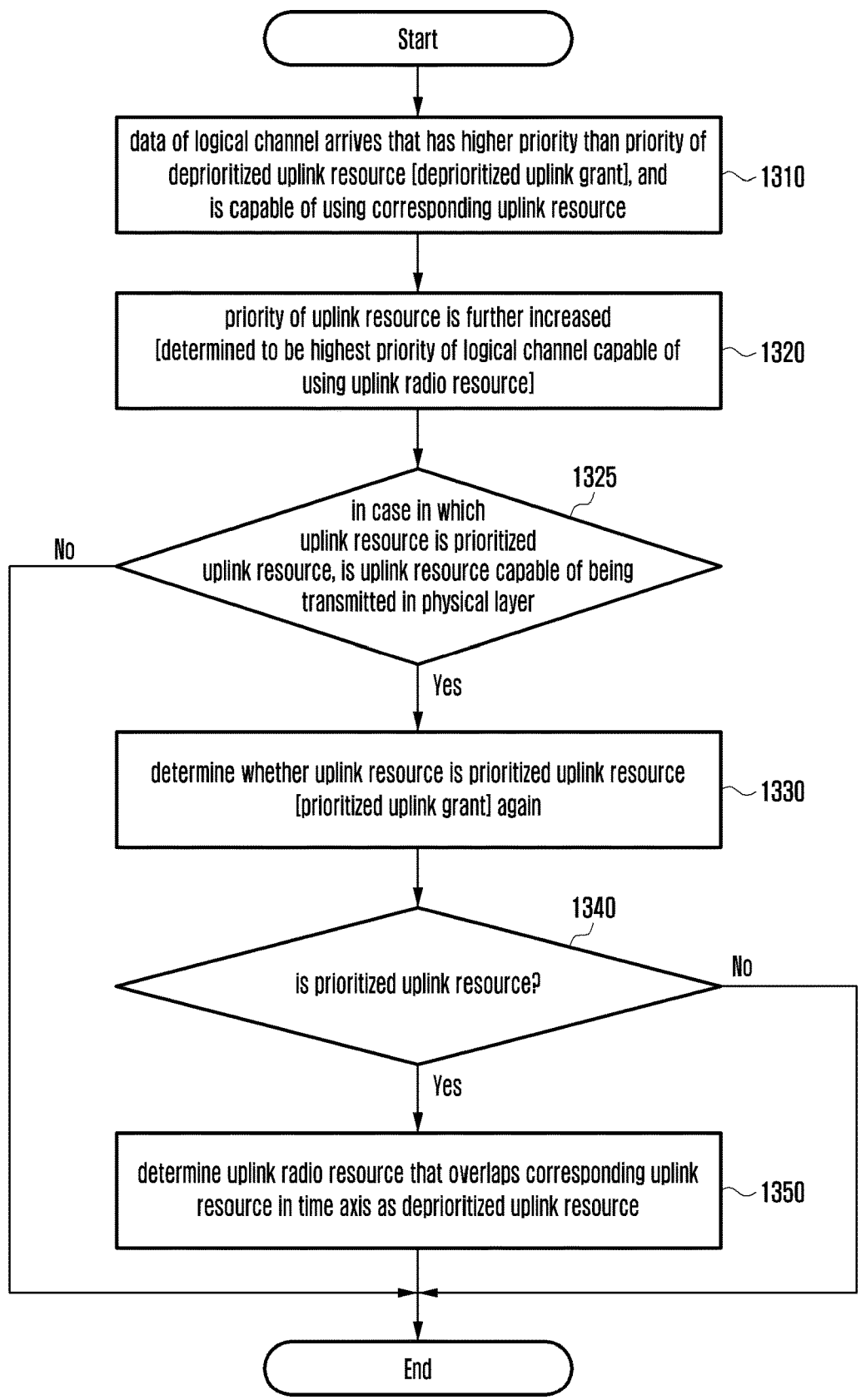
FIG. 13 is a diagram illustrating an operation of determining whether an uplink radio resource is a prioritized uplink radio resource.

FIG. 13 is a diagram illustrating an operation of determining whether an uplink radio resource is a prioritized uplink radio resource. In the case in which an uplink radio resource is allocated, the priority of the corresponding uplink radio resource may be determined according to the embodiments which have been described with reference to FIGS. 6, 7, 8, and 11. In the case in which the priority of the uplink radio resource is determined, whether the corresponding uplink radio resource is a prioritized uplink radio resource (prioritized uplink grant) or a deprioritized uplink radio resource (deprioritized uplink grant) may be determined according to the embodiments which have been described with reference to FIGS. 5, 9, and 11. A prioritized uplink radio resource may be an uplink radio resource that is capable of being used for actual transmission, and a deprioritized uplink radio resource is not used for actual transmission. However, for the reason that data having a high priority arrives at a deprioritized uplink radio resource, or the like, in the case in which the priority of the corresponding uplink radio resource is further increased (the priority value is changed to a smaller value), the uplink radio resource may have the possibility of being a prioritized uplink radio resource.

In the embodiment of FIG. 13, it is assumed that data of a logical channel having a higher priority than that of a deprioritized uplink radio resource, and is capable of using the corresponding uplink radio resource arrives in operation 1310. In this instance, the priority of the uplink radio resource may be further increased. In the case in which a MAC PDU that is to use the uplink radio resource is not produced in advance, the priority of the uplink radio resource may be determined to be the highest priority of a logical channel capable of using the uplink radio resource in operation 1320.

However, the uplink radio resource was a deprioritized uplink radio resource and thus, transmission of another uplink radio resource that overlaps the corresponding radio resource in time axis may be being processed as a prioritized uplink radio resource. Therefore, only when the deprioritized uplink radio resource is changed to a prioritized uplink radio resource and actual transmission is performed in the physical layer, the fact that the uplink radio resource becomes a prioritized radio resource may change a transmission operation. Therefore, although the priority of the uplink radio resource is increased, in the case in which the uplink radio resource becomes a prioritized uplink radio resource, whether the prioritized uplink radio resource is an uplink radio resource capable of being transmitted in the physical layer may be determined in operation 1325.

In the case in which a PHY priority index for an existing prioritized uplink radio resource has a lower priority than a PHY priority index for an existing deprioritized uplink radio resource, if the existing deprioritized uplink radio resource becomes a prioritized uplink radio resource, the uplink radio resource may be used for actual transmission. In this manner, in the case in which the existing deprioritized uplink radio resource becomes a prioritized uplink radio resource, and is capable of being transmitted in the physical layer, whether the uplink radio resource is a prioritized uplink radio resource may be determined in operation 1330.

A UE may determine whether the uplink radio resource is a prioritized uplink resource in operation 1340. An operation of determining whether the uplink radio resource is a prioritized uplink radio resource may be determined according to the method described with reference to FIGS. 5, 9, and 11, or may be determined according to other predetermined methods. In the case in which the uplink radio resource is determined as a prioritized uplink radio resource in operation 1340, another uplink radio resource that overlaps the corresponding uplink radio resource in the time axis may be determined as a deprioritized uplink resource (deprioritized uplink grant) in operation 1350. Transmission of the corresponding uplink radio resource to the physical layer which is a lower layer may be indicated.

Figure 14:
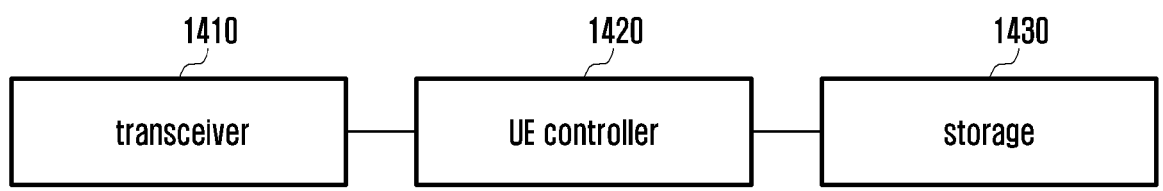
FIG. 14 is a diagram illustrating the structure of a UE according to an embodiment of the disclosure.

FIG. 14 is a diagram illustrating the structure of a UE according to an embodiment of the disclosure.

Referring to FIG. 14, a UE may include a transceiver 1410, a UE controller 1420, and a storage 1430. In the disclosure, the UE controller 1420 may be referred to as a controller, and may be defined as a circuit, an application-specified integrated circuit, or at least one processor.

The transceiver 1410 may perform signal transmission or reception with another network entity. The transceiver 1410 may receive, for example, system information from a base station, and may receive a synchronization signal or a reference signal.

The UE controller 1420 may control the overall operation of the UE according to an embodiment of the disclosure. For example, the controller 1420 may control a signal flow among blocks so that operations based on the above-described flowcharts are performed.

In addition, the UE controller 1420 may perform control so as to obtain an uplink transmission resource, to determine whether the uplink transmission resource uses a media access control (MAC) protocol data unit (PDU) stored in a hybrid automatic repeat request (HARQ) buffer, and to identify the priority of the uplink transmission resource based on the determination result.

In addition, the UE controller 1420 may perform control so as to obtain an uplink transmission resource, to determine whether a media access control (MAC) protocol data unit (PDU) to be transmitted in the uplink transmission resource is stored in the hybrid automatic repeat request (HARQ) buffer, and to identify the priority of the uplink transmission resource based on a determination result. In addition, in the case in which the MAC PDU to be transmitted in the uplink transmission resource is stored in the HARQ buffer, the UE controller 1420 may perform control so as to identify the priority of the uplink transmission resource based on the highest priority among the priorities of logical channels multiplexed to the MAC PDU. In addition, in the case in which the MAC PDU to be transmitted in the uplink transmission resource is not stored in the HARQ buffer, the UE controller 1420 may perform control so as to identify the priority of the uplink transmission resource based on the priority of data available that can be multiplexed to the MAC PDU transmitted in the uplink transmission resource.

In addition, in the case in which the uplink transmission is transmitted in a physical layer, the UE controller 1420 may perform control so as to identify the priority of the uplink transmission resource as a prioritized uplink transmission resource. In addition, in the case in which new data that that uses the uplink transmission resource is obtained, the UE controller 1420 may perform control so as to identify the prioritized uplink transmission resource based on the priority of a logical channel related to the new data. In addition, in the case in which the priority of the logical channel related to the new data is higher than the priority of the uplink transmission resource, the UE controller 1420 may perform control so as to identify the priority of the uplink transmission resource as the prioritized uplink transmission resource. In addition, the UE controller 1420 may perform control so as to identify another uplink transmission resource that overlaps the uplink transmission resource as a deprioritized uplink transmission resource.

The storage 1430 may store at least one piece of information among information transmitted or received via the transceiver 1410 and information produced by the UE controller 1420.

Figure 15:
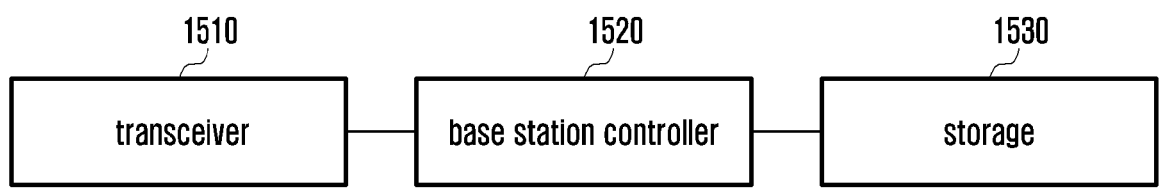
FIG. 15 is a diagram illustrating the structure of a base station according to an embodiment of the disclosure.

FIG. 15 is a diagram illustrating the structure of a base station according to an embodiment.

Referring to FIG. 15, the base station may include a transceiver 1510, a base station controller 1520, and a storage 1530. In the disclosure, the base station controller 1520 may be referred to as a controller, and may be defined as a circuit, an application-specified integrated circuit, or at least one processor.

The transceiver 1510 may perform signal transmission or reception with another network entity. The transceiver 1510 may transmit, for example, system information to a UE, and may transmit a synchronization signal or a reference signal.

The base station controller 1520 may control the overall operation of the base station according to the embodiments of the disclosure. For example, the base station controller 1520 may control a signal flow among blocks so that operations based on the above-described flowcharts are performed.

The storage 1530 may store at least one piece of information among information transmitted or received via the transceiver 1510 and information produced by the controller 1520.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A method of a user equipment (UE) in a wireless communication system, the method comprising:
   receiving, from a base station, an uplink transmission resource;
   determining whether a medium access control (MAC) protocol data unit (PDU) to be transmitted in the uplink transmission resource is stored in a hybrid automatic repeat request (HARQ) buffer; and identifying a priority of the uplink transmission resource,
wherein, in case that the MAC PDU to be transmitted in the uplink transmission resource is stored in the HARQ buffer, the priority of the uplink transmission resource is identified based on a highest priority among priorities of logical channels multiplexed to the MAC PDU, and
wherein, in case that the MAC PDU to be transmitted in the uplink transmission resource is not stored in the HARQ buffer, the priority of the uplink transmission resource is identified based on a highest priority of logical channels that have data available to be multiplexed to a MAC PDU transmitted via the uplink transmission resource.

2. The method of claim 1, wherein, in case that the uplink transmission is capable of being transmitted in a physical layer and there is no other uplink transmission resource overlapped with the uplink transmission resource whose priority is higher than the priority of the uplink transmission resource, the uplink transmission resource is identified as a prioritized uplink transmission resource.

3. The method of claim 1, wherein, in case that the uplink transmission is capable of being transmitted in a physical layer and new data that uses the uplink transmission resource is obtained, a prioritized uplink transmission resource is identified based on a priority of a logical channel related to the new data.

4. The method of claim 3, wherein, in case that the priority of the logical channel related to the new data is higher than the priority of the uplink transmission resource, the priority of the uplink transmission resource is newly identified based on the priority of the logical channel related to the new data.

5. The method of claim 1, wherein, in case that the uplink transmission is capable of being transmitted in a physical layer and there is another uplink transmission resource overlapped with the uplink transmission resource whose priority is higher than the priority of the uplink transmission resource, the another uplink transmission resource is identified as a prioritized uplink transmission resource.

6. The method of claim 2, wherein the other uplink transmission resource is identified as a deprioritized uplink transmission resource.

7. The method of claim 1, wherein, in case that another uplink transmission resource that overlaps the uplink transmission resource is present, uplink transmission is determined based on the priority of the uplink transmission resource.

8. A user equipment (UE) in a wireless communication system, the UE comprising:
a transceiver; and
a controller configured to:
receive, from a base station, an uplink transmission resource,
determine whether a medium access control (MAC) protocol data unit (PDU) to be transmitted in the uplink transmission resource is stored in a hybrid automatic repeat request (HARQ) buffer, and
identify a priority of the uplink transmission resource,
wherein, in case that the MAC PDU to be transmitted in the uplink transmission resource is stored in the HARQ buffer, the priority of the uplink transmission resource is identified based on a highest priority among priorities of logical channels multiplexed to the MAC PDU, and
wherein, in case that the MAC PDU to be transmitted in the uplink transmission resource is not stored in the HARQ buffer, the priority of the uplink transmission resource is identified based on a highest priority of logical channels that have data available to be multiplexed to a MAC PDU transmitted via the uplink transmission resource.

9. The UE of claim 8, wherein, in case that the uplink transmission is capable of being transmitted in a physical layer and there is no other uplink transmission resource overlapped with the uplink transmission resource whose priority is higher than the priority of the uplink transmission resource, the uplink transmission resource is identified as a prioritized uplink transmission resource.

10. The UE of claim 8, wherein, in case that the uplink transmission is capable of being transmitted in a physical layer and new data that uses the uplink transmission resource is obtained, a prioritized uplink transmission resource is identified based on a priority of a logical channel related to the new data.

11. The UE of claim 10, wherein, in case that the priority of the logical channel related to the new data is higher than the priority of the uplink transmission resource, the priority of the uplink transmission resource is newly identified based on the priority of the logical channel related to the new data.

12. The UE of claim 8, wherein, in case that the uplink transmission is capable of being transmitted in a physical layer and there is another uplink transmission resource overlapped with the uplink transmission resource whose priority is higher than the priority of the uplink transmission resource, the another uplink transmission resource is identified as a prioritized uplink transmission resource.

13. The UE of claim 9, wherein the other uplink transmission resource is identified as a deprioritized uplink transmission resource.

14. The UE of claim 8, wherein, in case that another uplink transmission resource that overlaps the uplink transmission resource is present, uplink transmission is determined based on the priority of the uplink transmission resource.

* * * * *